US010671584B2

(12) United States Patent
Kondratova et al.

(10) Patent No.: US 10,671,584 B2
(45) **Date of Patent: *Jun. 2, 2020**

(54) IDENTIFYING UNVISITED PORTIONS OF VISITED INFORMATION

(71) Applicant: International Business Machines Corporation, Armonk, NY (US)

(72) Inventors: Eugenia Kondratova, Ottawa (CA); Obidul Islam, Ottawa (CA); Paul Ionescu, Kanata (CA); Iosif Viorel Onut, Kanata (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 310 days.

This patent is subject to a terminal disclaimer.

(21) Appl. No.: 15/701,534

(22) Filed: Sep. 12, 2017

(65) Prior Publication Data

US 2017/0371873 A1 Dec. 28, 2017

Related U.S. Application Data

(63) Continuation of application No. 15/202,224, filed on Jul. 5, 2016, now Pat. No. 9,916,337, which is a (Continued)

(30) Foreign Application Priority Data

Jun. 6, 2012 (CA) ..................................... 2779235

(51) Int. Cl.
*G06F 16/00* (2019.01)
*G06F 16/22* (2019.01)
(Continued)

(52) U.S. Cl.
CPC ........ *G06F 16/2255* (2019.01); *G06F 16/951* (2019.01); *G06F 16/955* (2019.01); *G06F 16/9535* (2019.01); *H04L 67/02* (2013.01)

(58) Field of Classification Search
CPC ............. G06F 16/2255; G06F 16/9535; G06F 16/955; G06F 16/532; G06F 16/353;
(Continued)

(56) References Cited

U.S. PATENT DOCUMENTS 6,094,684 A 7/2000 Pallman
6,418,433 B1 7/2002 Chakrabarti et al.
(Continued)

FOREIGN PATENT DOCUMENTS

CA 2779235 A1 12/2013
WO 9722069 A1 6/1997

OTHER PUBLICATIONS

CA Appln. 2,779,235, Office Action, dated Mar. 12, 2018, 4 pg.
(Continued)

*Primary Examiner* — Anh Ly
(74) *Attorney, Agent, or Firm* — Cuenot, Forsythe & Kim, LLC

(57) ABSTRACT

Identifying unvisited portions of visited information to visit includes receiving information to crawl, wherein the information is representative of one of web based information and non-web based information, computing a locality sensitive hash (LSH) value for the received information, and identifying a most similar information visited thus far. Identifying unvisited portions of visited information further includes determining whether the LSH of the received information is equivalent to most similar information visited thus far and, responsive to a determination that the LSH of the received information is not equivalent to most similar information visited thus far, identifying a visited portion of
(Continued)

the received information using information for most similar information visited thus far and crawling only unvisited portions of the received information.

18 Claims, 10 Drawing Sheets

Related U.S. Application Data continuation of application No. 13/911,306, filed on Jun. 6, 2013, now Pat. No. 9,430,567.

(51) Int. Cl.
*G06F 16/951* (2019.01)
*G06F 16/955* (2019.01)
*G06F 16/9535* (2019.01)
*H04L 29/08* (2006.01)

(58) Field of Classification Search
CPC ........ G06F 17/30; G06F 16/13; G06F 16/174; G06F 16/137; G06F 3/06; G06F 11/14; G06F 16/31; G06F 16/00; G06F 16/248; G06F 16/252; G06F 16/316; G06F 16/951; G06F 16/2228; G06F 16/2477; G06F 16/24564; G06F 3/04842; G06F 3/0482; G06F 3/0485; G06F 17/2705; G06F 16/2372; G06F 16/9024; H04L 67/02
See application file for complete search history.

(56) References Cited

U.S. PATENT DOCUMENTS 6,757,724 B1* 6/2004 Fields .................. G06F 16/954 709/223
7,680,785 B2 3/2010 Najork
8,625,907 B2 1/2014 Zitnick et al.
8,874,485 B2 10/2014 Partridge et al.
9,298,757 B1 3/2016 Ponvert et al.
9,430,567 B2 8/2016 Kondratova et al.
9,916,337 B2 3/2018 Kondratova et al.
2002/0032772 A1 3/2002 Olstad et al.
2003/0149694 A1 8/2003 Ma et al.
2005/0038785 A1 2/2005 Agrawal et al.
2006/0048214 A1* 3/2006 Pennington ............ H04L 63/10 726/5
2006/0101341 A1* 5/2006 Kelly .................. G06F 17/2235 715/738
2006/0129463 A1* 6/2006 Zicherman ............ G06Q 30/02 705/14.73
2006/0161591 A1* 7/2006 Huang .................. G06F 16/951
2007/0038659 A1* 2/2007 Datar .................. G06F 16/9535
2007/0143263 A1* 6/2007 Agrawal ............... G06F 16/951
2007/0239710 A1 10/2007 Jing et al.
2008/0139191 A1* 6/2008 Melnyk ............... H04L 67/2823 455/419
2008/0162474 A1 7/2008 Thong et al.
2008/0228675 A1* 9/2008 Duffy .................... G06F 40/295 706/10
2008/0235163 A1 9/2008 Balasubramanian et al.
2008/0307301 A1* 12/2008 Decker ............... G06F 16/9577 715/241
2008/0319980 A1 12/2008 Pickens et al.
2009/0164425 A1* 6/2009 Olston .................. G06F 16/951 707/E17.108
2009/0171986 A1 7/2009 Chitrapura et al.
2009/0198662 A1 8/2009 Prabhakar et al.
2009/0204638 A1 8/2009 Hollier et al.
2010/0070509 A1* 3/2010 Li ...................... G06F 16/2264 707/747
2010/0122220 A1 5/2010 Ainsworth et al.
2010/0191799 A1 7/2010 Fiedorowicz et al.
2010/0205168 A1* 8/2010 Yang ..................... G06F 16/951 707/709
2010/0287462 A1* 11/2010 Hauser .................. G06F 16/951 715/241
2011/0078159 A1 3/2011 Li et al.
2011/0106796 A1 5/2011 Svaic
2011/0219012 A1* 9/2011 Yih ......................... G06F 16/00 707/749
2012/0011588 A1* 1/2012 Milener .................. G06F 21/51 726/24
2012/0284275 A1* 11/2012 Vadrevu ................ G06F 16/358 707/738
2013/0073514 A1 3/2013 Cai et al.
2013/0097246 A1 4/2013 Zifroni et al.
2013/0297590 A1 11/2013 Zukovsky et al.
2013/0332444 A1 12/2013 Kondratova et al.
2014/0143251 A1 5/2014 Wang et al.
2015/0169754 A1 6/2015 Gu et al.
2015/0199357 A1* 7/2015 Hwang ................. G06F 16/954 707/748
2016/0019232 A1 1/2016 Lambright
2016/0070797 A1* 3/2016 Ionescu ................ G06F 16/951 707/709
2016/0092591 A1* 3/2016 Barouni Ebrahimi .. G06F 16/93 707/709
2016/0188619 A1 6/2016 Su et al.
2016/0314119 A1 10/2016 Kondratova et al.

OTHER PUBLICATIONS

U.S. Appl. No. 15/202,224, Notice of Allowance, dated Oct. 27, 2017, 10 pg.

Manku, G. S. et al., "Detecting near duplicates for web crawling," [online] In Proc.of 16th Int'l. Conf. On World Wide Web, pp. 141-150, ACM, 2007, retrieved from the Internet: <http://www.wwwconference.org/www2007/papers/paper215.pdf>, 9 pgs.

Charikar, M. S., "Similarity estimation techniques from rounding algorithms," [online] In Proc. of 34th Symposium on Theory of Computing (STOC), pp. 380-388, ACM, 2002, retrieved from the Internet: <http://www.bradblock.com.s3-website-us-west-1.amazonaws.com/Similarity_Estimation_Techniques_>, 9 pgs.

Van Durme, B. et al., "Online Generation of Locality Sensitive Hash Signatures," [online] In Proc. of ACL 2010 Conf. Short Papers, pp. 231-235, Jul. 2010, © 2010 Association for Computational Linguistics, retrieved from the Internet: <http://www.aclweb.org/anthology/P/P10/P10-2043.pdf>, 5 pgs.

Ravichandran, D. et al., "Randomized Algorithms and NLP: Using Locality Sensitive Hash Functions for High Speed Noun Clustering," [online] In Proc. of 43rd Annual Meeting of the Association for Computational Linguistics, pp. 622-629, Jun. 2005, retrieved from the Internet: <http://acl.ldc.upenn.edu/P/P05/P05-1077.pdf>, 8 pgs.

Batko, M. et al., "Scalability comparison of Peer-to-Peer similarity search structures," [online] Future Generation Computer Systems, vol. 24, No. 8, Oct. 2008, pp. 834-848, retrieved from the Internet: <http://www.sciencedirect.com/science/article/pii/S0167739X0700132X>, 1 pg.

Asaduzzaman, S. et al., "A locality preserving routing overlay using geographic coordinates," [online] In 2009 IEEE Int'l. Conf. on Internet Multimedia Systems Architecture and Applications (IMSAA), pp. 1-6, Dec. 2009, retrieved from the Internet: <http://beethoven.site.uottawa.ca/dsrg/Docs/Pub/Asad09b.pdf>.

Bar-Yossef, Z. et al., "Do Not Crawl in the DUST: Different URLs with Similar Text," In Proc. of 16th Int'l Conf. on World Wide Web (WWW '07), pp. 111-120, ACM © 2007.

Slawski, B., "Microsoft Creating Rules for Canonical URLs," [online] SEO by the Sea, Sep. 29, 2006, [retrieved May 4, 2011] retrieved from the Internet: <http://www.seobythesea.com/?p=316>, 5 pgs.

Fetterly, D. et al., "On the Evolution of Clusters of Near-Duplicate Web Pages," [online] In Journal of Web Engineering, vol. 2, Oct. 2004, retrieved from the Internet: <http://research.microsoft.com/apps/pubs/73807/laweb.pdf>, 9 pgs.

(56) References Cited

OTHER PUBLICATIONS

Stone, H.S. et al., "Efficient Search Techniques—An Empirical Study of the N-Queens Problem", IBM Journal of Research and Development, vol. 31, No. 4, pp. 464-474, 1987.

Czyzowicz, J. et al., "Optimal Exploration of Terrains with Obstacles," In Scandinavian Workshop on Algorithm Theory, 2010, vol. 6139, pp. 1-12 of the series Lecture Notes in Computer Science, 12th Scandinavian Sum and Workshop on Algorithm Theory, Jun. 21-23, 2010.

U.S. Appl. No. 13/911,306, Non-Final Office Action, dated Feb. 1, 2016, 12 pg.

U.S. Appl. No. 13/911,306, Notice of Allowance, dated May 24, 2016, 4 pg.

U.S. Appl. No. 15/202,224, Non-Final Office Action, Oct. 4, 2016, 22 pg.

U.S. Appl. No. 15/202,224, Final Office Action, dated Mar. 3, 2017, 25 pg.

U.S. Appl. No. 15/202,224, Notice of Allowance, dated Jun. 22, 2017, 9 pg.

* cited by examiner

Identification system 300

1000

| Page LSH<br>1002 | LSH-1, LSH-2, LSH-3, ...LSH-n<br>1004 |
|---|---|

Page 1:

```
<input type="button" value="Logout" onclick
="document.navForm.action='logout';"/>

<form id="navForm" name="navForm" action="default.aspx" method

  ="post">
        <input type="hidden" value="" />
        <input type="submit" value="Next">
  </form>
```

1104

Page 2:

```
<a href="#" onclick="document.navForm.action='home';"></a>

<form id="Form1" name="navForm" action="default.aspx" method
="post">
      <input type="hidden" value="" />
      <input type="submit" value="Next">
</form>
```

IDENTIFYING UNVISITED PORTIONS OF VISITED INFORMATION

CROSS-REFERENCE TO RELATED APPLICATIONS

This application claims the benefit of Canada Application Number 2779235 filed on Jun. 6, 2012, which is fully incorporated herein by reference.

BACKGROUND

Web-crawlers spider web sites in a methodical and automated way to analyze the web sites determining whether issues related to web vulnerabilities, accessibility, quality and a myriad of other purposes exist. Typically in web sites, the same web components or web information appear repeatedly across different pages of the site to facilitate site navigation. Crawling redundant components increases time and resources needed.

For example, a web crawler visits two web pages in which the pages have a common HTML form control. When the web crawler scans a second web page, the crawler detects the HTML form control was already scanned as part of a first page scan but skips the second page scan to avoid redundant processing only when the complete content of the web pages is similar.

A previous solution typically identifies two pages as the same when the pages are analyzed to be structurally similar. A similarity algorithm of the previous solution operates on a page level and assumes a repetitive consecutive sequence of HTML elements is redundant for analysis purposes. The technique can be applied in each sub-structure of a page, however the previous solution typically lacks scalability and efficiency. The previous solution generates an MD5 hash value as an identifier (ID) of a DOM or HTML elements. Accordingly a slightly different HTML can produce a completely different MD5 hash value and for each computed hash value of a page the crawler would need to search in a record repository comprising many records to determine whether a specific sub-tree or control was scanned previously.

In a similar solution, using similarity estimation, Gurmeet (Gurmeet S. Manku, Arvind Jain, Anish D. Sarma, (2007) "*Detecting near duplicates for web crawling,*" *Proceedings of the* 16*th international conference on World Wide Web*, pp: 141-150) proposed a method to use a Locality Sensitive Hash (LSH) [Charikar (Moses Charikar, *Similarity estimation techniques from rounding algorithms. In Proceedings of* 34*th Symposium on Theory of Computing* (*STOC*) (2002), 380-388)] to detect near duplicate web pages. Benjamin Van (Benjamin Van Durme and Ashwin Lall, *Online Generation of Locality Sensitive Hash Signatures, Proceedings of the ACL* 2010 *Conference Short Papers*, pages 231-235, Uppsala, Sweden, 11-16 *Jul.* 2010. © *Association for Computational Linguistics*) revisited the work of Ravichandran (Deepak Ravichandran, Patrick Pantel, and Eduard Hovy. *Randomized Algorithms and NLP: Using Locality Sensitive Hash Functions for High Speed Noun Clustering, Proceedings of the* 43*rd Annual Meeting of the ACL*, pages 622-629, Ann Arbor, June 2005. © 2005 *Association for Computational Linguistics*) and Charikar (2002) in asserting that an online version of an LSH signature can be maintained. However, the work presented consisted of detecting complete content similarity (every character in an HTML page) of a web page. Other proposed similar solutions include those by Batkoa 2008 ("*Scalability comparison of Peer-to-Peer similarity search structures*" Michal Batkoa, David Novaka, Fabrizio Falchib, Pavel Zezulaa, *Journal Future Generation Computer Systems archive Volume* 24 Issue 8, October, 2008) and S. Asaduzzaman 2009 (*A locality preserving routing overlay using geographic coordinates* (S. Asaduzzaman and G. v. Bochmann) *IEEE Intern. Conf on Internet Multimedia Systems Architecture and Application*, Bangalore, India, December 2009).

BRIEF SUMMARY

According to one embodiment, a computer-implemented process for identifying unvisited portions of visited information to visit, receives information to crawl, wherein the information is representative of one of web based information and non-web based information, computes a locality sensitive hash (LSH) value for the received information and identifies a most similar information visited thus far. The computer-implemented process determines whether the LSH of the received information is equivalent to most similar information visited thus far and responsive to a determination that the LSH of the received information is not equivalent to most similar information visited thus far, identifies a visited portion of the received information using information for most similar information visited thus far and crawls only unvisited portions of the received information.

According to another embodiment, a computer program product for identifying unvisited portions of visited information to visit comprises a computer recordable-type media containing computer executable program code stored thereon. The computer executable program code comprises computer executable program code for receiving information to crawl, wherein the information is representative of one of web based information and non-web based information; computer executable program code for computing a locality sensitive hash (LSH) value for the received information; computer executable program code for identifying a most similar information visited thus far; computer executable program code for determining whether the LSH of the received information is equivalent to most similar information visited thus far; computer executable program code responsive to a determination that the LSH of the received information is not equivalent to most similar information visited thus far, identifying a visited portion of the received information using information for most similar information visited thus far and computer executable program code for crawling only unvisited portions of the received information.

According to another embodiment, an apparatus for identifying unvisited portions of visited information to visit comprises a communications fabric, a memory connected to the communications fabric, wherein the memory contains computer executable program code, a communications unit connected to the communications fabric, an input/output unit connected to the communications fabric, a display connected to the communications fabric and a processor unit connected to the communications fabric. The processor unit executes the computer executable program code to direct the apparatus to receive information to crawl, wherein the information is representative of one of web based information and non-web based information, to compute a locality sensitive hash (LSH) value for the received information, to identify a most similar information visited thus far and determine whether the LSH of the received information is equivalent to most similar information visited thus far. Responsive to a determination that the LSH of the received information is not equivalent to most similar information visited thus far, the processor unit executes the computer executable program code to direct the apparatus to identify a visited portion of the received information using information for most similar information visited thus far and to crawl only unvisited portions of the received information.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

FIG. 11 is a textual representation of a code snippet of two different contexts operable for various embodiments of the disclosure.

DETAILED DESCRIPTION

Figure 1:
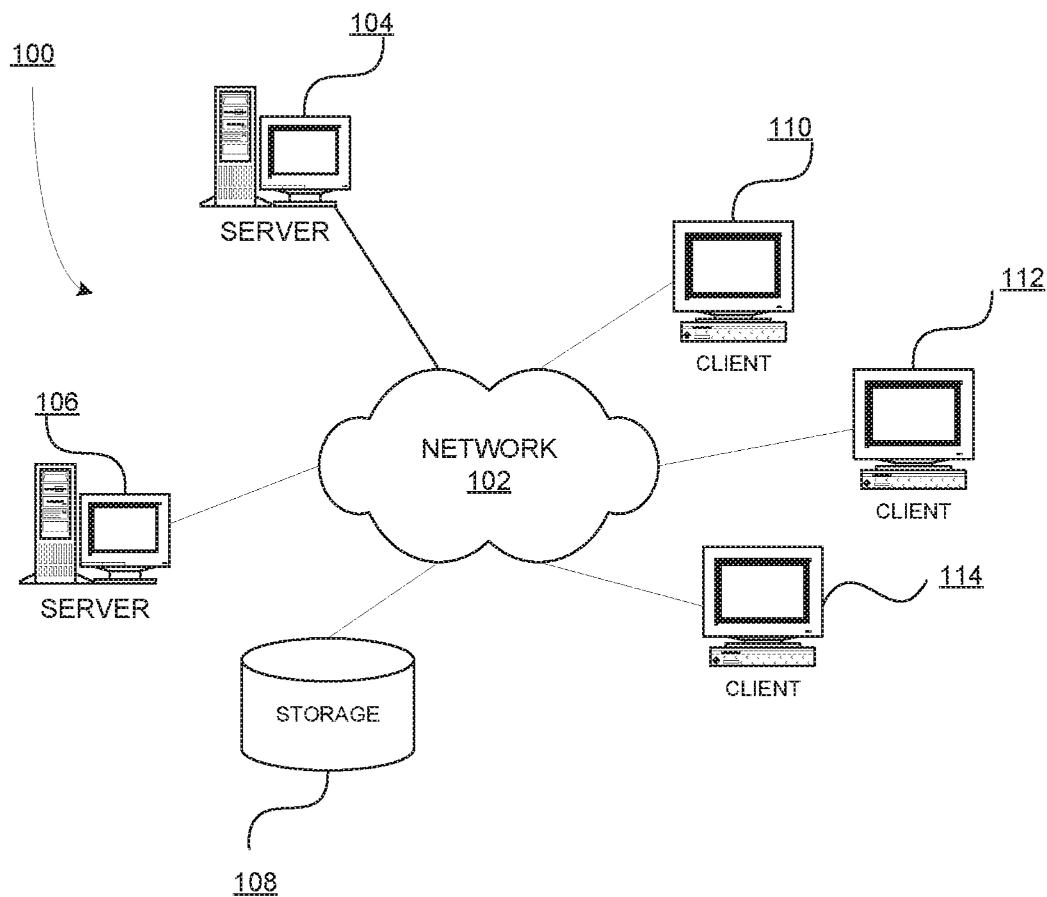
FIG. 1 is a block diagram of an exemplary network data processing system operable for various embodiments of the disclosure.

This disclosure relates generally to exploring information in a data processing system and more specifically to identifying unvisited portions of visited information to visit in the data processing system.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer-readable program code embodied thereon.

Any combination of one or more computer-readable data storage medium(s) may be utilized. A computer-readable data storage medium may be, for example, but not limited to, an electronic, magnetic, optical, or semiconductor system, apparatus, or device, or any suitable combination of the foregoing. More specific examples (a non-exhaustive list) of the computer-readable data storage medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device or any suitable combination of the foregoing. In the context of this document, a computer-readable data storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
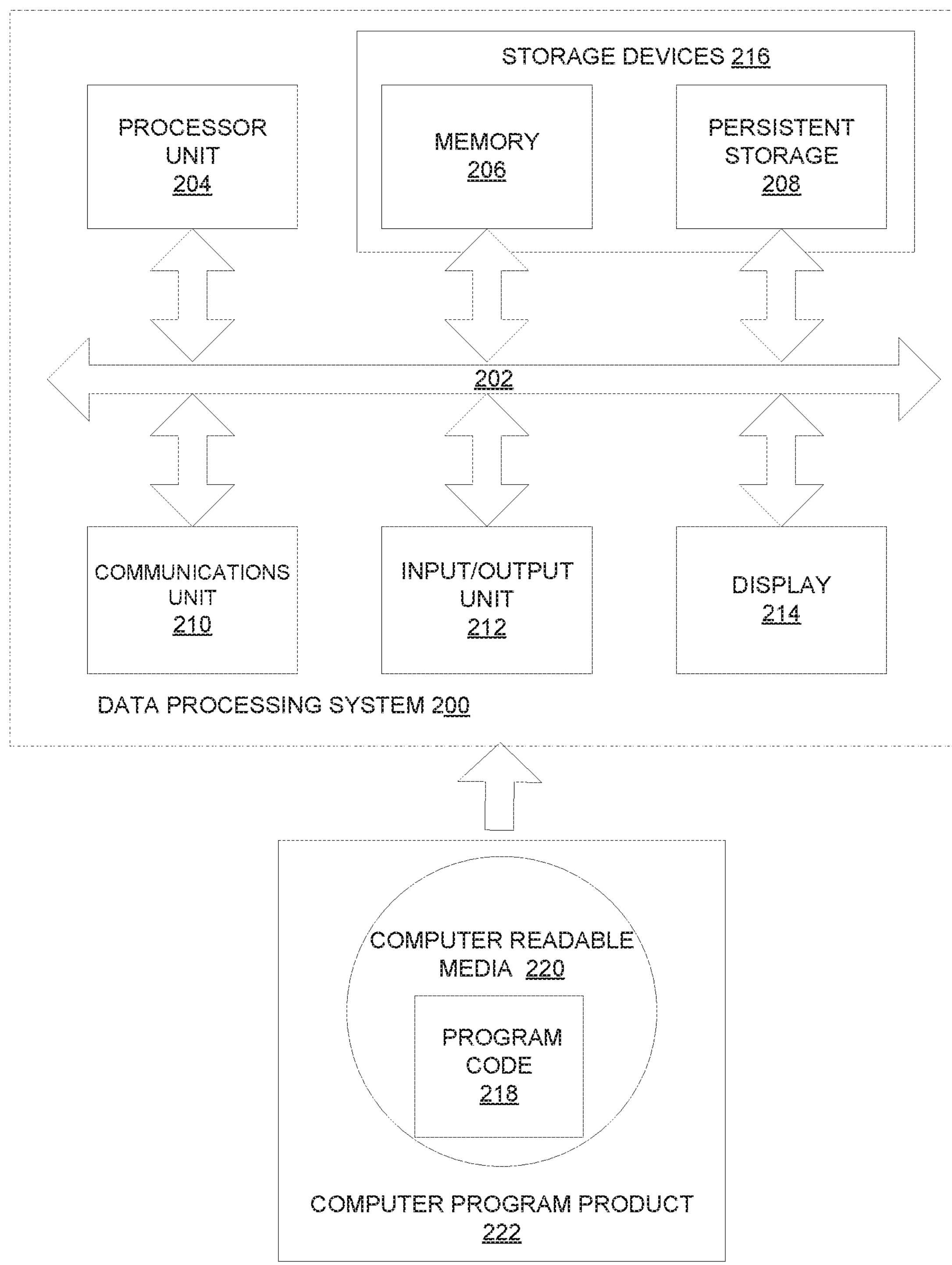
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer-readable program code that may be read and executed by a processor in processor unit 204. The program code in the different embodiments may be embodied on different physical or tangible computer-readable storage media, such as memory 206 or persistent storage 208.

Program code 218 is located in a functional form on computer-readable storage media 220 that is selectively removable and may be loaded onto or transferred to data processing system 200 for execution by processor unit 204. Program code 218 and computer-readable storage media 220 form computer program product 222 in these examples. In one example, computer-readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable storage media 220 also may take the form of a persistent storage, such as a hard drive, a thumb drive, or a flash memory that is connected to data processing system 200. The tangible form of computer-readable storage media 220 is also referred to as computer recordable storage media. In some instances, computer-readable storage media 220 may not be removable.

Alternatively, program code 218 may be transferred to data processing system 200 from computer-readable storage media 220 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer-readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for identifying unvisited portions of visited information to visit, is presented. Processor unit 204 receives information to crawl, using communication unit 210, through network 102 of network data processing system 100 of FIG. 1, input/output unit 212 storage devices 216 wherein the information is representative of one of web-based information and non-web based information, computes a locality sensitive hash (LSH) value for the received information and identifies a most similar information visited thus far in a repository maintained in storage devices 216. Processor unit 204 determines whether the LSH of the received information is equivalent to most similar information visited thus far and responsive to a determination that the LSH of the received information is not equivalent to most similar information visited thus far, identifies a visited portion of the received information using information for most similar information visited thus far. Processor unit 204 crawls only unvisited portions of the received information.

An embodiment of the disclosed process attempts to follow a process of how a user would explore a website. A user typically attempts to detect parts of a page already visited and explore only non-visited parts. The simple process is repeated for each page, which narrows the problem space, and eventually exploration stops. Embodiments of the disclosed process provide a capability using a Locality Sensitive Hash (LSH) signature to identify visited parts of a page. Using embodiments of the disclosure enable a crawler to explore only unvisited portions of a website, thereby reducing redundant analysis.

Since a page may contain hundreds of HTML tags, with a correspondingly large number of HTML tags associated with a site, identifying visited HTML tags is non-trivial task, hence a number of combinations grows exponentially and a simple search in the problem space is not practical. Rather, there is a need to only query content of a most similar page (or pages) to the page being analyzed, based on a page structure, since the pages should have a high probability of containing common controls. Once a set of similar pages is computed, the embodiment of the disclosed process searches inside the structure for controls similar to controls in the current page analyzed, and eliminate processing of already processed sets of HTML tags.

Figure 3:
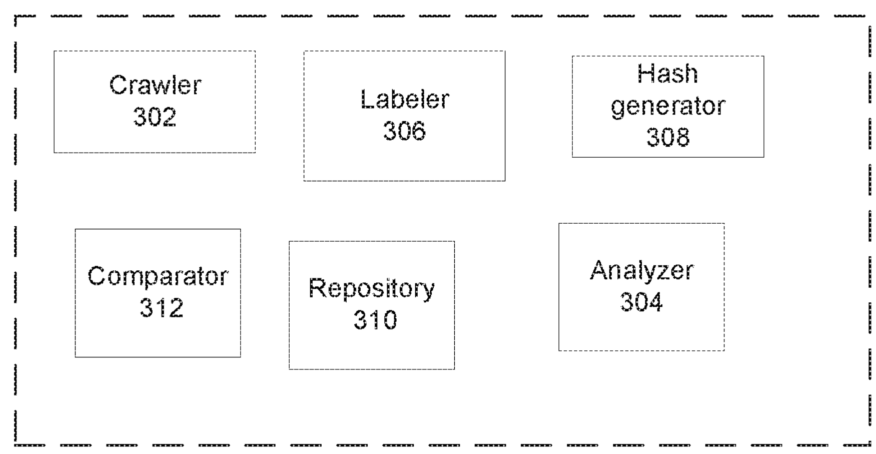
FIG. 3 is a block diagram of an identification system operable for various embodiments of the disclosure.

With reference to FIG. 3 a block diagram of an identification system operable for various embodiments of the disclosure is presented. Identification system 300 is an example embodiment providing a capability of the disclosed process.

Identification system 300 comprises a number of components leveraging an underlying system, for example network data processing 100 of FIG. 1 or data processing 200 of FIG. 2. The components illustrated provide a representation of the functional components comprising identification system 300 which may be implemented in alternative embodiments. For example, the function components may be combined into logical or physical collections of function without loss of capability.

Identification system 300 contains components including crawler 302, analyzer 304, labeler 306, hash generator 308, repository 310 and comparator 312. Crawler 302, in the example is a web crawler suitable for processing pages of web sites. However in other embodiments the component may represent an indexer or other document processor, wherein a document is representative of an object of non-web-based data.

Analyzer 304 provides a capability of examining a page being processed to identify structural elements, also referred to as controls. For example, using the document a document object model (DOM) representative of the page is traversed to identify the hypertext markup language elements contained within. An element is a node of the DOM.

Labeler 306 provides a capability of removing extraneous attributes from the tags or labels identified using analyzer 304. The unnecessary information in the form of attributes of a tag is discarded. An identifier for each label is generated using generator 308. Generator 308, in the example embodiment, provides a capability of creating a hierarchy of locality sensitivity hash (LSH) values for each desired element and associated sub-elements, wherein a final LSH value represents the page LSH value.

Repository 310 provides a capability in the form of a data storage data structure for saving the generated output of generator 308. LSH values representing a page and associated elements are maintained with repository 310 for subsequent processing.

Comparator 312 provides a capability of examining a pair of pages to determine whether the pair corresponds to a predefined matching threshold. The matching threshold is identified by a user and may be specified as an exact match, in which case the two page in comparison are equivalent in structure or a form of a relaxed match in which a predefined level of matching is requested. For example, specifying acceptable match criteria as when 8 of 10 elements comprising a page match, rather than all elements match. The match criteria may also specify a range, for example when between 5 and 8 elements of a set of elements match.

Embodiments of the disclosure use a tree structure representation of LSH keys generated to encode reduced (stripped) DOM information representative of a page (the object being process) and to generate a final LSH key representative of the page as a whole. The generated key can be used later using a distance function to quickly retrieve a most similar page from a repository (for example, a database), wherein the most similar page is most structurally similar with the corresponding current page.

Figure 4:
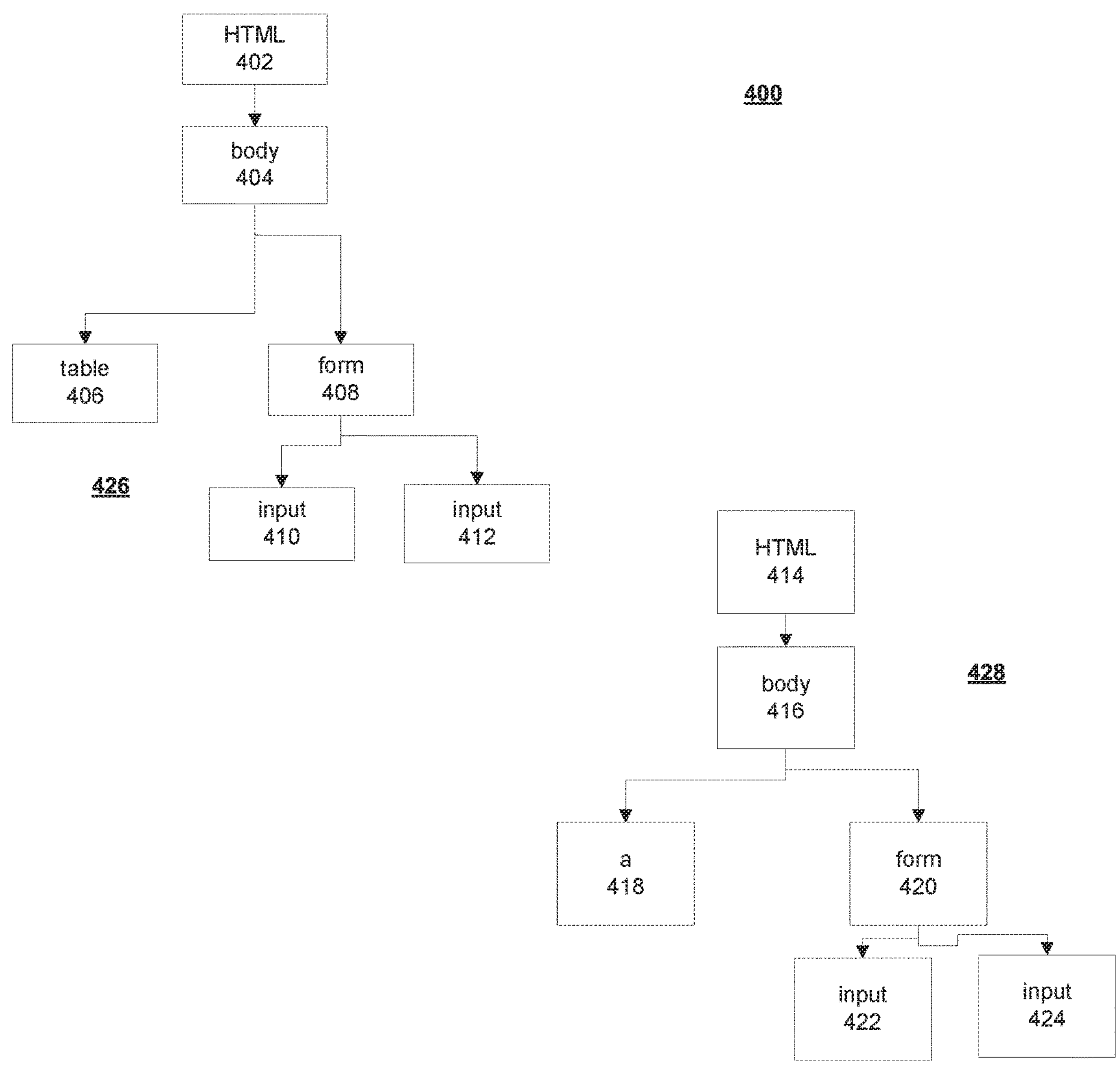
FIG. 4 is a block diagram of page structures having redundant elements in accordance with one embodiment of the disclosure.

With reference to FIG. 4 a block diagram of page structures having redundant elements operable for various embodiments of the disclosure is presented. Page structures 400 is an example embodiment depicting page elements being processed using identification system 300 of FIG. 3.

Page 426 represents a collection of elements including a top level or root element of HTML 402, followed in a descending level of the hierarchy body 404, table 406 and form 408 with sub-elements input 410 and input 412. In a similar manner page 428 represents a collection of elements including a top level or root element of HTML 414, followed in a descending level of the hierarchy body 416, a 418 and form 420 with associated sub-elements input 422 and input 424.

Using identification system 300 of FIG. 3 enables crawler 302 also of FIG. 3 to identify whether form 420 of page 428 is equivalent to the previously crawled form 408 of page 426. Form 408 and form 420 represent a portion of page 426 and 428 respectively. Accordingly using identification system 300 of FIG. 3 enables a requester to avoid crawling a portion of a web page when page comparison indicates the pages are not identical web pages.

LSH is a method providing a capability to search for and identify an exact or nearest neighbor in a high dimensional space. Charikar discloses an LSH method, which maps high dimensional vectors to smaller dimensions in the form of fingerprints while the similarity of the vectors in the original dimensions are preserved. Benjamin Van Durme also used the method of Charikar for the same purpose of detecting web page similarity.

Figure 5:
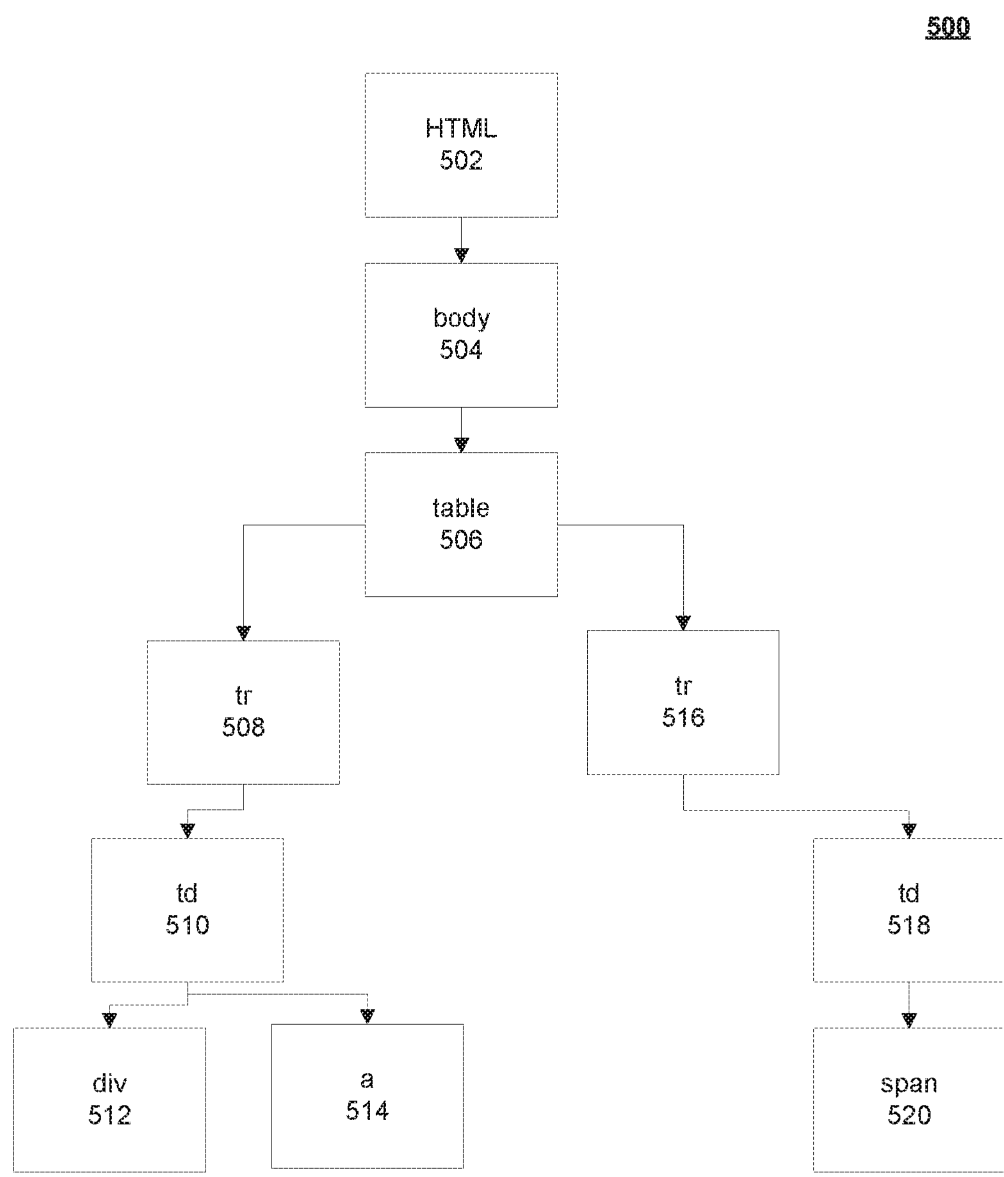
FIG. 5 is a block diagram of a page structure operable for various embodiments of the disclosure.

With reference to FIG. 5 a block diagram of a page structure operable for various embodiments of the disclosure is presented. Page structure 500 is an example embodiment depicting a hierarchy of page elements for processing using identification system 300 of FIG. 3. In the example, tags are represented as <tag> or tag equally.

Using the example of page structure 500, an HTML control typically comprises a collection of HTML elements. For example, assume <table> 506 element, depending from HTML 502 element and body 504 element in a hierarchical tree view of an HTML document object model (DOM) represents a control. Sub-trees rooted at <td> 510 and <tr> 508 elements are the sub-structures contained within control <table> 506. In a similar manner a sub-tree rooted at <tr> 516 contains <td> 518 element which further contains a sub-structures <span> 520 contained within control <table> 506.

To generate an identifier (ID) of <table> 506, IDs of all sub-elements contained in the control are generated; in this example IDs are also created for <td> 510 and <tr> 508 elements. The individual IDs are used in combination to create a final ID of the page. For example, the ID of <table> 506 element is used to generate the ID of <body> 504 element. This process continues until HTML 502 at the top of page DOM is reached at which point is generated an ID of the whole page.

Hence, an embodiment of the disclosed process of identification system 300 of FIG. 3 uses a reduced DOM in which remain only the HTML tags, without respective attributes, of a web page in a bottom-up order. In a sub-processing step, all nodes from the DOM are removed except element nodes. However, an embodiment of the disclosed process can be easily augmented for other types of DOM elements as well. Starting with the leaves of the DOM tree and working up to the root element, an embodiment of the disclosed process computes each intermediary LSH signature. For example, an embodiment of the disclosed process computes the LSH signature for each non-leaf node of a DOM whose children are all leaf nodes. Each lower level generated signature value is pushed upward to a parent node for computing an LSH signature of the parent. The process iterates until a root node is reached. The LSH of the root is considered to be the LSH of the page as well.

Figure 6:
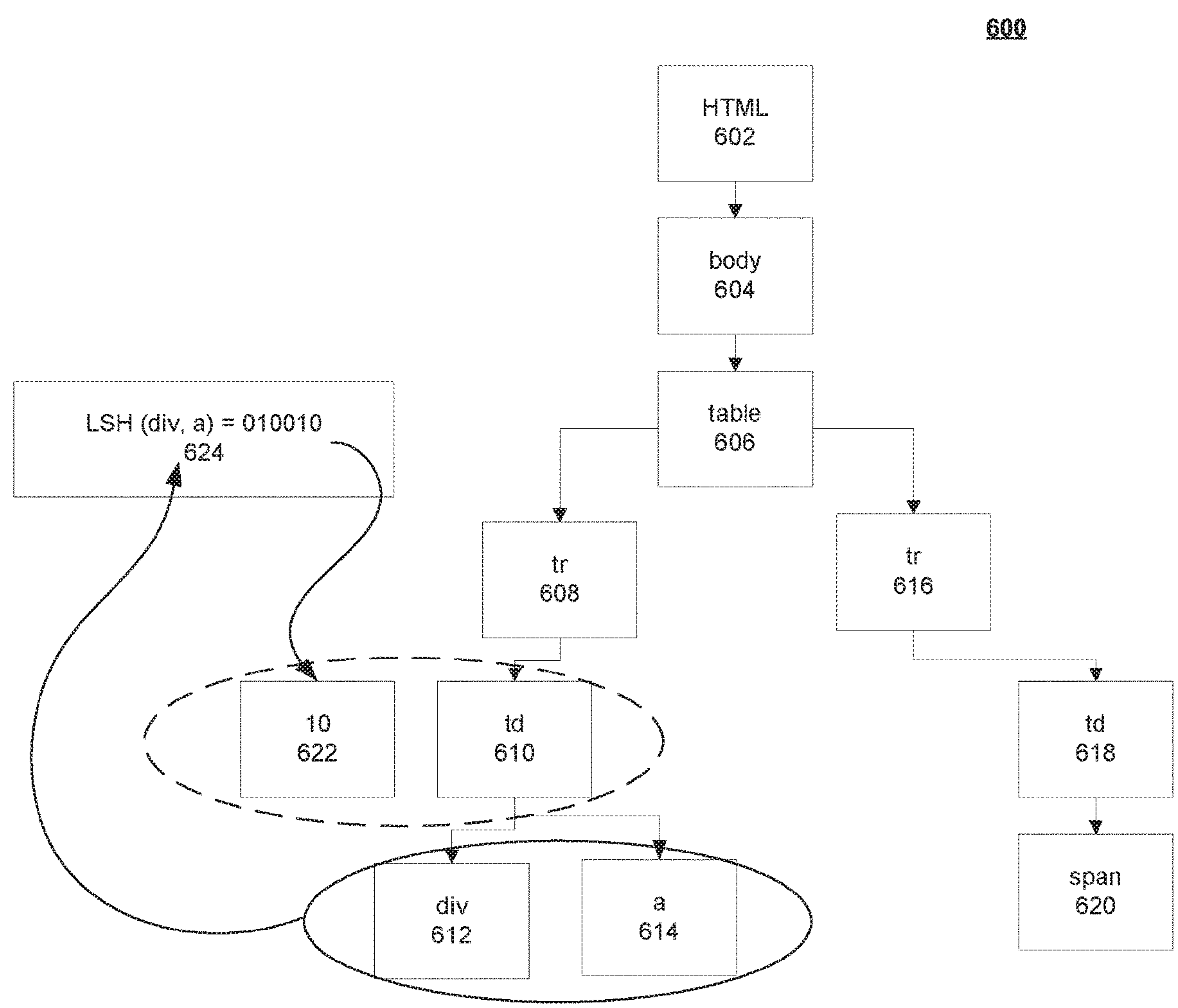
FIG. 6 is a block diagram of LSH signature calculation operable for various embodiments of the disclosure.

With reference to FIG. 6 a block diagram of LSH signature calculation operable for various embodiments of the disclosure is presented. Page structure 600 is an example embodiment depicting a hierarchy of page elements of FIG. 5.

In the example of page structure 600, <table> 606 element, depending from HTML 602 element and body 604 element in a hierarchical tree view of an HTML document object model (DOM) represents a control. Sub-trees rooted at <td> 610 and <tr> 608 elements are the sub-structures contained in within control <table> 606. In a similar manner a sub-tree rooted at <tr> 616 contains <td> 618 element which further contains a sub-structures <span> 620 also contained within control <table> 606. Tags, also referred to as labels, including the <td> tags are examples of non-leaf nodes whose children are all leaf nodes. For the tag of <td> 610, an LSH signature (10) for a combination of inputs of <div> 612 and <a> 614 is calculated.

The generated signature identifies a sub-tree rooted at <td> 610 element. The integer value of signature(10) 622 is then pushed upward to the parent <td> 610 element. Next, an LSH signature of <tr> 608 representing a combination of <td> 610 and (10) 622 are calculated and the resulting value is further pushed to parent node <tr> 608. This process continues until a final LSH value of the tag <html> 602 is generated. The final LSH signature encodes a structure of the page. The calculated LSH signature is persisted in the repository, such as repository 310 of identification system 300 of FIG. 3.

Figure 7:
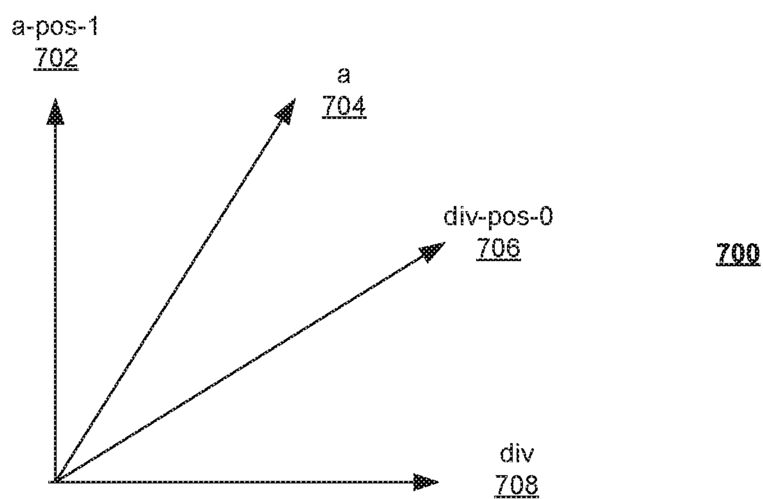
FIG. 7 is a block diagram of a feature space representation of an HTML tag sequence operable for various embodiments of the disclosure.

With reference to FIG. 7 a block diagram of a feature space representation of an HTML tag sequence operable for various embodiments of the disclosure is presented. Feature space representation 700 is an example embodiment depicting a representation of feature vectors using HTML elements of FIG. 6.

An LSH signature calculation requires representing feature vectors of the problem domain in a high dimensional space. To calculate an LSH of a sequence of HTML tags, three types of features are considered. One type of feature is the reduced HTML tags or labels excluding text and attributes for example, tags <a>, <br>. This first feature type indicates what types of HTML tags are included in the signature, for example, a 704 and div 708.

Another type represents a position of a respective HTML tag in a sequence. In the current example, the positional information is defined in general as <tag>-pos-number in the current specific example a-pos-1 702 and div-pos-0 706. This feature type encodes order information of HTML tags in a sequence. For example, the feature space to generate an LSH signature of the sub-tree rooted at <td> 610 element of the DOM shown in FIG. 6 involves the first two types of features as shown.

Figure 8:
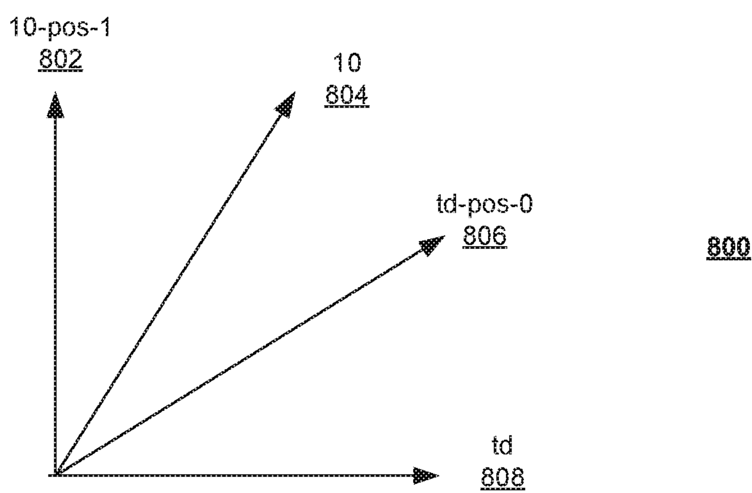
FIG. 8 is a block diagram of a feature space representation of an HTML tag sequence operable for various embodiments of the disclosure.

With reference to FIG. 8 a block diagram of a feature space representation of an HTML tag sequence operable for various embodiments of the disclosure is presented. Feature space representation 800 is a further example embodiment depicting a representation of feature vectors using HTML elements of FIG. 6.

Another type is an integer value of the LSH signature of a sub-tree of the DOM. The last type of feature includes structural information of a sub-tree rooted at a specific node. Assume after computation, the sub-tree LSH value, is 10. Following computation of the integer value, the LSH signature of the sub-tree rooted at <tr> 608 of FIG. 6 is generated. Note the positional value of the sub-tree LSH is same as the positional value of the HTML tag, which holds the sub-tree.

As in FIG. 7, a first feature type indicates what types of HTML tags are included in the signature, for example, 10 804 and td 808. The other type represents a position of a respective HTML tag in a sequence of the current example, as 10-pos-1 802 and td-pos-0 806.

Figures 9, 10:
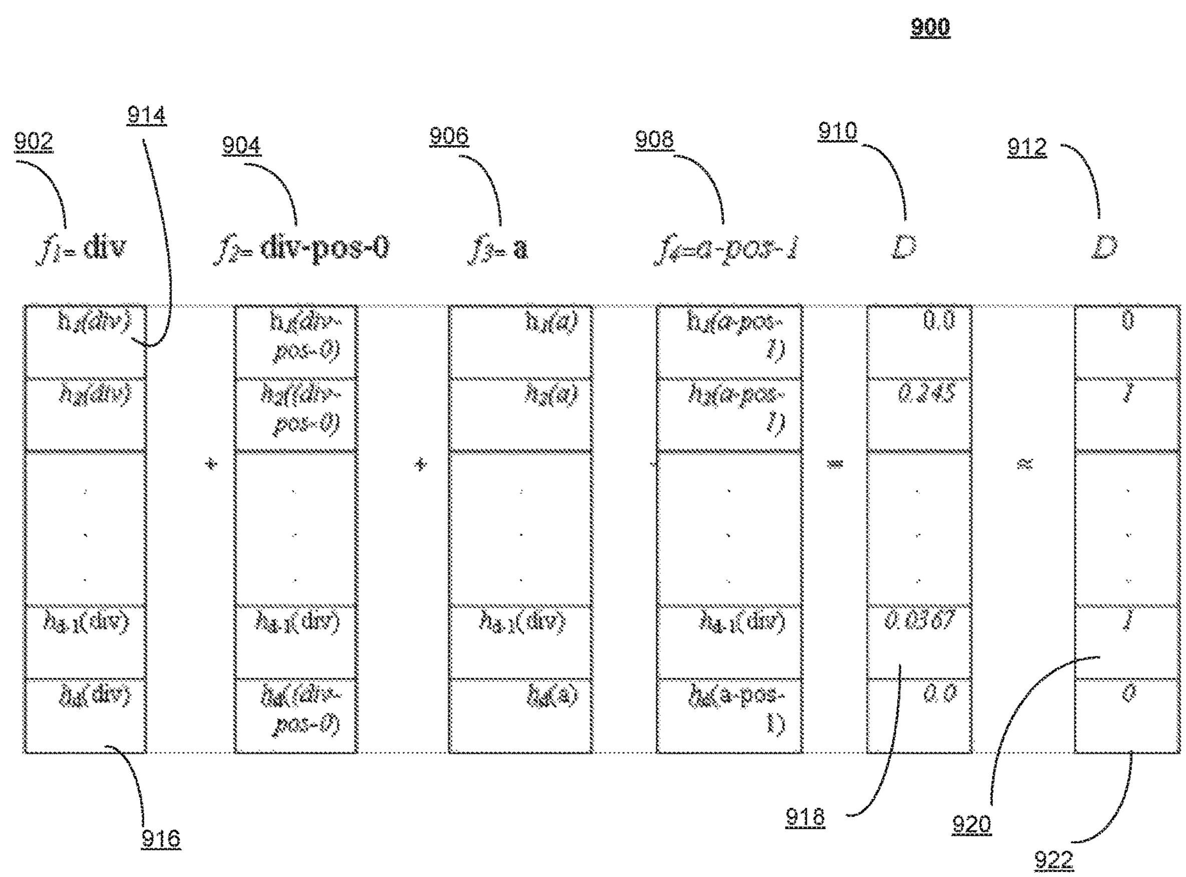
FIG. 9 is a block diagram of a feature vector representation operable for various embodiments of the disclosure.
FIG. 10 is a block diagram of a data structure representation of a page signature with all sub-tree signatures operable for various embodiments of the disclosure.

With reference to FIG. 9 a block diagram of a feature vector representation operable for various embodiments of the disclosure is presented. Feature vector representation 900 is a further example embodiment depicting a representation of feature vectors using HTML elements of FIG. 6. FIG. 9 demonstrates the signature calculation and the vector representation of the feature space shown in FIG. 7.

Once the ordered HTML tags are presented in a feature space, an embodiment of the disclosed process uses a streaming LSH algorithm, for example as suggested by Benjamin, to generate an f-bit signature. A pool m of pre-computed Gaussian-distributed random values N(0,1) is maintained, so that each feature (for example, HTML tags, HTML tag position, integer value of LSH signature and respective position) can hash into random values. To create a d-bit signature of a given sequence of HTML tags, an embodiment of the disclosed process maintains d-hash functions (for example, h1, h2, . . . hd hash functions) wherein a hash function is applied to a corresponding each feature.

A hash function maps a specific feature into one of d-random values from pool m. The fixed mapping enables association of the same feature hash into specific random values drawn from random values N(0,1). Each element of a resulting vector contains a partial dot product of the feature vector of the sequence with a random unit vector. When the same feature is observed in a sequence, each component of a resulting vector is incremented by random values associated with that feature accessed by the hash functions h1 to hd. When all features of a given HTML sequence are processed, a sign of the components determines the final bits of the signature.

Using the example of FIG. 9 an LSH signature is computed for a given HTML tag sequence. To create a signature of length d, a floating-point vector D of the same length is maintained and each element is initialized. Given an HTML sequence of two tags <div> and <a>, a feature space is created as shown in FIG. 7. Next, each feature fi (shown as feature 902, feature 904, feature 906, and feature 908) is represented as a unit vector of d elements which maps d random values drawn from N(0,1) accessed through hash functions h1 to hd (hashed value 914 is an example of a first feature div represented as $h_1f_1$ and hashed value 916 is an example the last instance of the first feature div represented as $h_df_1$).

Next, each component of resulting vector D 910 is incremented by the random value of the unit vector representative of each respective feature. When all feature or unit vectors are processed a sign of the resulting vector D 912 produces a signature of the given HTML tag sequence. For example when a value in resulting vector D 910 is zero or less a value of zero, value 922, is placed in a corresponding level entry in resulting vector D 912 and when a value in resulting vector D 910 is greater than zero, as in value 918, a value of one, value 920, is placed in a corresponding level entry in resulting vector D 912.

The integer value of the calculated LSH signature is then pushed up to through each next higher level to the parent node of the HTML sequence (For FIG. 6, the LSH signature of <div> and <a> is pushed to <td> tag). This signature value is then treated as a feature for the LSH signature calculation of next layer. This process continues until the top of the DOM is reached which generates a final LSH signature of the entire web page having combined respective signatures from all previous levels.

With reference to FIG. 10 a block diagram of a data structure representation of a page signature with all sub-tree signatures operable for various embodiments of the disclosure is presented. Page signature representation 1000 is an example page signature with all sub-tree signatures created using identification system 300 of FIG. 3.

When saving a page signature, embodiments of the disclosed process also store the LSH signatures of all sub-trees generated during page LSH signature calculation in a repository, such as repository 310 of FIG. 3. Entry 1002 is the LSH signature of the page and entry 1004 contains signatures of the structures of page, each separated by a delimiter to form persisted signature 1000.

Once the LSH signature of a page is computed, the signature may be queried in the repository to find a most similar match using known techniques, for example techniques disclosed by Gurmeet, Batkoa or S. Asaduzzaman. When an exact match is found the current web page is a duplicate of a previously seen web page; therefore processing of the page is terminated. When a near duplicate page is found, signatures of the sub-trees are retrieved and compared with signatures of the sub-trees of the current page. If a sub-tree signature of the current page is found in the retrieved list of signatures the analysis of a corresponding sub-tree is skipped to avoid redundant processing.

With reference to FIG. 11 a textual representation of a code snippet of two different contexts operable for various embodiments of the disclosure is presented. Contexts 1100 is an example representation of two differing contexts in which a common form element is available as may be encountered using identification system 300 of FIG. 3.

Using the example of contexts 1100, links of a visited part of a page can be affected by the context in which the links are found. For example, a user data form inside an account registration page will produce different links than links for the same form located inside an account update page. In the example of contexts 1100 the navForm element is referenced from two different contexts of logout 1102 and home 1104. However, an embodiment of the disclosed process navigates the navForm element for both pages of contexts 1100 because the navForm element is referenced in different contexts.

In this example discarding a second part causes the crawler to miss links. The situation may be addressed using an embodiment of the disclosed process to search for references to elements located inside a visited part of the page within an unvisited surrounding context. When references are found the context is influencing the navigational state of the part. Other fragments of the two pages that are also similar should be ignored from the reference search since they represent a context that exists in both pages.

Other situations where links could be missed are those in which small elements are used. Embodiments of the disclosed process typically work well for large sections of the page however are not typically used to decide whether small elements should be visited. For example a button will be re-used in many different contexts and yield a different action every single time.

Specific element attributes may also be considered during calculation of the LSH since some specific element attributes can have an impact on a navigational state, and accordingly the context of use. For example, specific element attributes, which may be considered, are those including form action attributes, hrefs and onclick types of event values.

Figure 12:
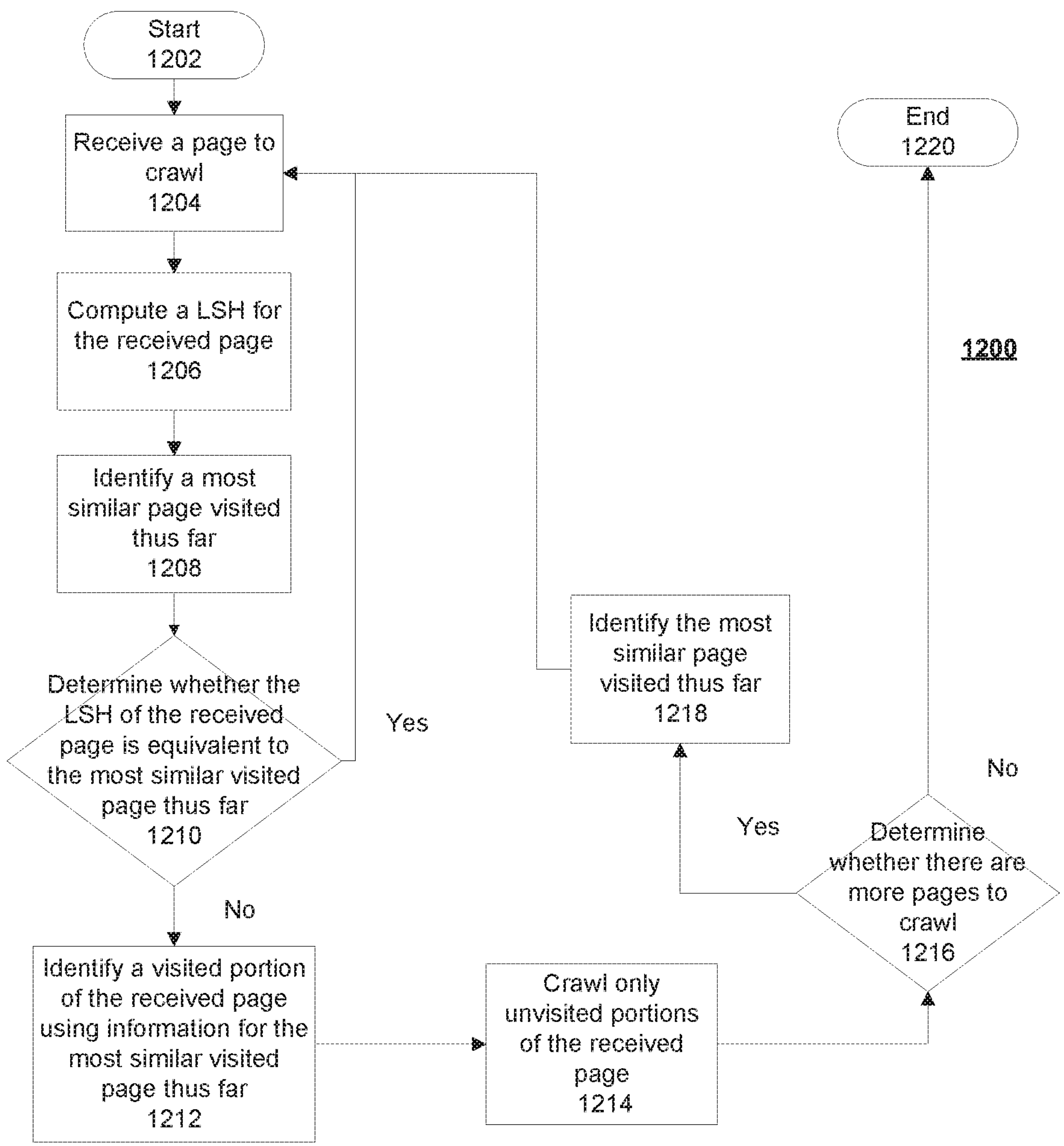
FIG. 12 is a flowchart of a process of identification operable for various embodiments of the disclosure.

With reference to FIG. 12 flowchart of a process of identification operable for various embodiments of the disclosure is presented. Process 1200 is an example of a process using identification system 300 of FIG. 3. The particular example uses a web crawler visiting web pages of a web site or sites other exemplary uses of the process include indexing of non-web content. The exploration strategy for web pages is out of scope of the current process. The current process presumes the crawler uses a crawl process to navigate through pages.

In an example of the disclosed process for identifying unvisited portions of visited information to visit, the process is generalized to receive information to crawl, wherein the information is representative of one of web based information and non-web based information, compute a locality sensitive hash (LSH) value for the received information, identify a most similar information visited thus far and determine whether the LSH of the received information is equivalent to most similar information visited thus far. Responsive to a determination that the LSH of the received information is not equivalent to most similar information visited thus far, the example identifies a visited portion of the received information using information for most similar information visited thus far and crawls only unvisited portions of the received information. The crawling may also be exploring as in the case of non-web based information.

In the following a web-based example is presumed. Process 1200 begins (step 1202) and receives a page to crawl (step 1204). The page may be obtained by action of the web crawler or may be provided to the web crawler by a helper process. Process 1200 computes locality sensitive hash (LSH) for the received page (step 1206). Process 1200 uses a stripped DOM of the page (containing only the structural html tags of the page) to compute an LSH key.

Process 1200 identifies a most similar page visited thus far (step 1208). The most similar page visited thus far is located through a search of a data structure containing signatures of previously visited web pages. Process 1200 identifies a most similar page visited thus far using a distance function to compare the LSH signatures of a pair of corresponding pages. The data structure may be a repository such as repository 310 of FIG. 3 including a database, file or other persistent structure capable of containing the page signature information in an a query acceptable form. For example a comparison is made using records such as page signature representation 1000 of FIG. 10.

Process 1200 determines whether the LSH of the received page is equivalent to most similar page visited thus far (step 1210). The degree to which equivalence is determined is controlled by input from a user of process 1200. For example, strict adherence may be expressed as an exact match. In other situations an acceptable range may be provided, for example, matching signatures of between 3 and 5 elements from among available corresponding signatures of a pair of web page. In another example, a percentage maybe specified to indicate a degree of confidence in the similarities found between the corresponding pair of web pages. Relaxed conditions enable discrimination of web pages at a more granular level of comparison for respective portions of web pages.

Responsive to a determination that the LSH of the received page is equivalent to the most similar page visited thus far, process 1200 loops back to perform step 1204 as before. Responsive to a determination that the LSH of the received page is not equivalent to most similar page visited thus far, process 1200 identifies a visited portion of the received page using information from the most similar page visited thus far (step 1212). Identification uses the signature information from the most similar page visited thus far and the received page for corresponding structures within the respective web pages.

Process 1200 crawls only the unvisited portions of the received page (step 1214). The portions of the received page identified as visited portions enable process 1200 to indicate portions of the received page, which have not been visited and accordingly schedule only those portions for a crawl.

Process 1200 determines whether there are more pages to crawl (step 1216). Crawling may be replaced by a scan as in the process being used by a page scanning application. Responsive to a determination that there are more pages to crawl, process 1200 identifies the most similar page visited thus far (step 1218) and loops back to perform step 1204 as before. As previously stated, identifying the most similar page visited thus far uses a location service using a persistent repository of signatures or identifiers of previously visited pages including portions thereof.

Responsive to a determination that there are no more pages to crawl, process 1200 terminates (step 1220). Output of the crawl is provided in a conventional manner for subsequent processing by other applications.

Thus is presented in an illustrative embodiment a computer-implemented process for identifying unvisited portions of visited information to visit, receives information to crawl, wherein the information is representative of one of web based information and non-web based information, computes a locality sensitive hash (LSH) value for the received information and identifies a most similar information visited thus far. The computer-implemented process determines whether the LSH of the received information is equivalent to most similar information visited thus far and responsive to a determination that the LSH of the received information is not equivalent to most similar information visited thus far, identifies a visited portion of the received information using information for most similar information visited thus far and crawls only unvisited portions of the received information.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer-readable data storage medium having computer executable instructions stored thereon in a variety of forms. Examples of computer-readable data storage media include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer-implemented process, comprising:
receiving information to crawl;
computing, for the received information, a locality sensitive hash (LSH) value;
identifying, relative to the received information, a most similar information previously visited;
determining whether the LSH value of the received information is equivalent to the most similar information;
identifying, responsive to a determination that the LSH value of the received information is not equivalent to the most similar information, a portion of the received information using information for the most similar information as being visited; and
crawling only unvisited portions of the received information.

2. The computer-implemented process of claim 1, wherein
the LSH value for the received information is computed based upon:
receiving a reduced DOM containing only HTML tags without respective attributes;
removing all nodes from the reduced DOM except element nodes; and
computing an intermediary LSH signatures for each respective element node within the reduced DOM.

3. The computer-implemented process of claim 1 wherein
the determination that the LSH value of the received information is not equivalent to the most similar information is based upon a comparison of the LSH of the received information to an LSH of corresponding information.

4. The computer-implemented process of claim 3, wherein
the basis by which equivalence is determined is user-selected.

5. The computer-implemented process of claim 1, wherein
the portion of received information is identified as being visited based upon:
retrieving signatures of a sub-trees of corresponding information,
comparing the retrieved signatures of the sub-trees of the corresponding information with signatures of sub-trees of the received information, and
identifying a sub-tree signature of the received information in the retrieved signatures of the sub-trees of the corresponding information.

6. The computer-implemented process of claim 1, wherein
a sub-tree in the received information corresponding to the identified sub-tree signature is skipped during the crawling.

7. A computer hardware system, comprising:
a hardware processor configured to initiate the following operations:
receiving information to crawl;
computing, for the received information, a locality sensitive hash (LSH) value;
identifying, relative to the received information, a most similar information previously visited;
determining whether the LSH value of the received information is equivalent to the most similar information;
identifying, responsive to a determination that the LSH value of the received information is not equivalent to the most similar information, a portion of the received information using information for the most similar information as being visited; and crawling only unvisited portions of the received information.

8. The system of claim 7, wherein the LSH value for the received information is computed based upon:

receiving a reduced DOM containing only HTML tags without respective attributes;

removing all nodes from the reduced DOM except element nodes; and computing an intermediary LSH signatures for each respective element node within the reduced DOM.

9. The system of claim 7, wherein the determination that the LSH value of the received information is not equivalent to the most similar information is based upon a comparison of the LSH of the received information to an LSH of corresponding information.

10. The system of claim 9, wherein the basis by which equivalence is determined is user-selected.

11. The system of claim 7, wherein the portion of received information is identified as being visited based upon:

retrieving signatures of a sub-trees of corresponding information, comparing the retrieved signatures of the sub-trees of the corresponding information with signatures of sub-trees of the received information, and identifying a sub-tree signature of the received information in the retrieved signatures of the sub-trees of the corresponding information.

12. The system of claim 7, wherein a sub-tree in the received information corresponding to the identified sub-tree signature is skipped during the crawling.

13. A computer program product, comprising:

a computer hardware media having stored therein program code, the program code, which when executed by a computer hardware system, cause the computer hardware system to perform:

receiving information to crawl;

computing, for the received information, a locality sensitive hash (LSH) value;

identifying, relative to the received information, a most similar information previously visited;

determining whether the LSH value of the received information is equivalent to the most similar information;

identifying, responsive to a determination that the LSH value of the received information is not equivalent to the most similar information, a portion of the received information using information for the most similar information as being visited; and crawling only unvisited portions of the received information.

14. The computer program product of claim 13, wherein the LSH value for the received information is computed based upon:

receiving a reduced DOM containing only HTML tags without respective attributes;

removing all nodes from the reduced DOM except element nodes; and computing an intermediary LSH signatures for each respective element node within the reduced DOM.

15. The computer program product of claim 13, wherein the determination that the LSH value of the received information is not equivalent to the most similar information is based upon a comparison of the LSH of the received information to an LSH of corresponding information.

16. The computer program product of claim 13, wherein the basis by which equivalence is determined is user-selected.

17. The computer program product of claim 13, wherein the portion of received information is identified as being visited based upon:

retrieving signatures of a sub-trees of corresponding information, comparing the retrieved signatures of the sub-trees of the corresponding information with signatures of sub-trees of the received information, and identifying a sub-tree signature of the received information in the retrieved signatures of the sub-trees of the corresponding information.

18. The computer program product of claim 13, wherein a sub-tree in the received information corresponding to the identified sub-tree signature is skipped during the crawling.

* * * * *